US011870164B2

(12) United States Patent
Takayama et al.

(10) Patent No.: US 11,870,164 B2
(45) Date of Patent: Jan. 9, 2024

(54) ANTENNA MODULE AND COMMUNICATION DEVICE EQUIPPED WITH THE SAME

(71) Applicant: Murata Manufacturing Co., Ltd., Kyoto (JP)

(72) Inventors: Keisei Takayama, Kyoto (JP); Kaoru Sudo, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 400 days.

(21) Appl. No.: 17/364,091

(22) Filed: Jun. 30, 2021

(65) Prior Publication Data

US 2021/0328350 A1 Oct. 21, 2021

Related U.S. Application Data

(63) Continuation of application No. PCT/JP2020/000720, filed on Jan. 10, 2020.

(30) Foreign Application Priority Data

Jan. 10, 2019 (JP) ................................ 2019-002322

(51) Int. Cl.

| | |
|---|---|
| ***H01Q 9/04*** | (2006.01) |
| ***H01Q 5/378*** | (2015.01) |
| ***H01Q 1/50*** | (2006.01) |

(52) U.S. Cl.

CPC ............ *H01Q 9/0421* (2013.01); *H01Q 1/50* (2013.01); *H01Q 5/378* (2015.01)

(58) Field of Classification Search

CPC ......... H01Q 9/0421; H01Q 5/378; H01Q 1/50

See application file for complete search history.

(56) References Cited

U.S. PATENT DOCUMENTS

| | | | |
|---|---|---|---|
| 2018/0219281 | A1 | 8/2018 | Sudo et al. |
| 2019/0157762 | A1 | 5/2019 | Shibata et al. |

FOREIGN PATENT DOCUMENTS

| | | | |
|---|---|---|---|
| CN | 108376833 | A | 8/2018 |
| JP | 2002-271131 | A | 9/2002 |
| JP | 2017-143474 | A | 8/2017 |
| JP | 2019-092130 | A | 6/2019 |

OTHER PUBLICATIONS

International Search Report for International Application No. PCT/JP2020/000720, dated Mar. 24, 2020.

Written Opinion for International Application No. PCT/JP2020/000720, dated Mar. 24, 2020.

*Primary Examiner* — Graham P Smith

(74) *Attorney, Agent, or Firm* — Pearne & Gordon LLP

(57) ABSTRACT

An antenna module includes a dielectric substrate having a multilayer structure, a ground electrode disposed in the dielectric substrate, a plate-like fed element facing the ground electrode and disposed at a layer different from a layer including the ground electrode, a feed line for transferring a radio-frequency signal to a feed point of the fed element, and a stub. The stub branches off from the feed line at a branch point of the feed line and has an open end. The stub is disposed between the fed element and the ground electrode. When the dielectric substrate is viewed in plan view, the open end coincides with the fed element.

14 Claims, 14 Drawing Sheets

ANTENNA MODULE AND COMMUNICATION DEVICE EQUIPPED WITH THE SAME

CROSS REFERENCE TO RELATED APPLICATIONS

This is a continuation of International Application No. PCT/JP2020/000720 filed on Jan. 10, 2020 which claims priority from Japanese Patent Application No. 2019-002322 filed on Jan. 10, 2019. The contents of these applications are incorporated herein by reference in their entireties.

BACKGROUND

Technical Field

The present disclosure relates to an antenna module and a communication device equipped with the antenna module and more particularly relates to a technology for enhancing characteristics of an antenna module including a stub.

Known technologies widen the band supported by an antenna with the use of a stub provided in a transmission line used to transfer radio-frequency signals to a radiating element (fed element).

Japanese Unexamined Patent Application Publication No. 2002-271131 (Patent Document 1) discloses a configuration including stubs of different shapes provided at almost the same position in a transmission line of a patch antenna for the purpose of widening the band width of radio-frequency signals that the patch antenna can emit.

Patent Document 1: Japanese Unexamined Patent Application Publication No. 2002-271131

BRIEF SUMMARY

A need exists for further improvements in antenna characteristics of an antenna module having the configuration described in Japanese Unexamined Patent Application Publication No. 2002-271131 (Patent Document 1).

The present disclosure improves antenna characteristics of an antenna module including a stub.

An antenna module according to the present disclosure includes a dielectric substrate having a multilayer structure, a ground electrode disposed in or on the dielectric substrate, a plate-like fed element facing the ground electrode and disposed at a layer different from a layer including the ground electrode, a first feed line for transferring a radio-frequency signal to a first feed point of the fed element, and a first stub branching off from the first feed line at a first branch point of the first feed line. The first stub has a first open end. The first stub is disposed between the fed element and the ground electrode. When the dielectric substrate is viewed in plan view, the first open end coincides with the fed element.

An antenna module according to another aspect of the present disclosure includes a dielectric substrate having a multilayer structure, a ground electrode disposed in or on the dielectric substrate, a plate-like fed element facing the ground electrode and disposed at a layer different from a layer including the ground electrode, an unfed element facing the fed element and disposed at a layer different from the layer including the ground electrode and the layer including the fed element, a first feed line for transferring a radio-frequency signal to a first feed point of the fed element, and a first stub branching off from the first feed line at a first branch point of the first feed line. The first stub has a first open end. The first stub is disposed between the fed and unfed elements and the ground electrode. When the dielectric substrate is viewed in plan view, the first open end coincides with at least one of the fed element and the unfed element.

In the antenna module of the present disclosure, the open end of the stub, which branches off from the feed line for transferring a radio-frequency signal to the plate-like fed element, coincides with the fed element (or the unfed element) when the antenna module is viewed in plan view. This improves antenna characteristics, such as antenna gain.

DETAILED DESCRIPTION

Figure 1:
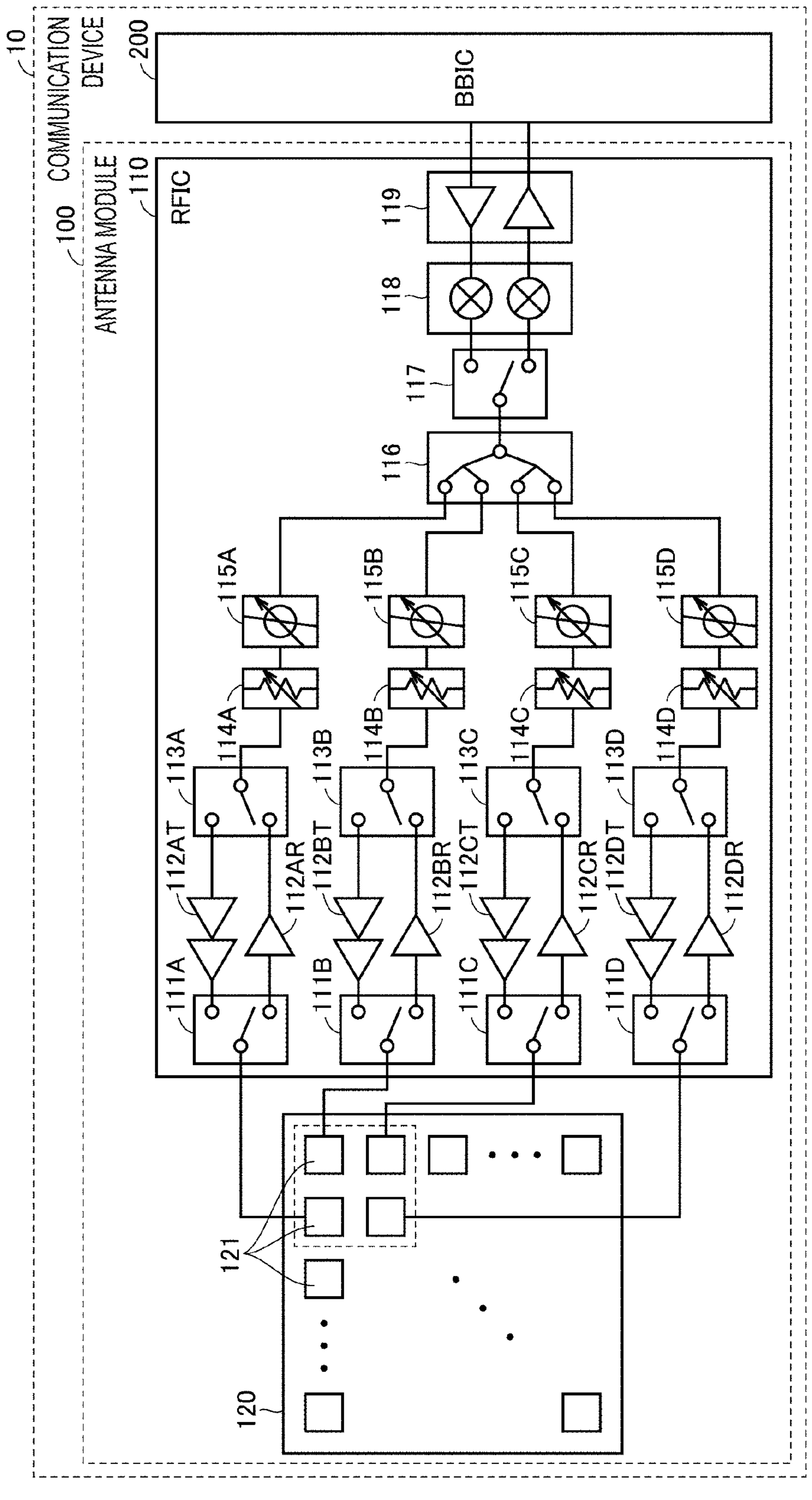
FIG. 1 is a block diagram of a communication device using an antenna module according to a first embodiment.

Hereinafter, embodiments of the present disclosure will be described in detail with reference to the drawings. Identical or corresponding portions in the drawings are assigned identical reference characters, and descriptions thereof are not repeated.

First Embodiment (Basic Configuration of Communication Device)

FIG. 1 is an example of a block diagram of a communication device 10 using an antenna module 100 according to a first embodiment. Examples of the communication device 10 include portable terminals, such as a mobile phone, a smartphone, and a tablet computer, and a personal computer having communication functionality. An example of frequency ranges of radio waves used for the antenna module 100 according to the present embodiment is radio waves in millimeter-wave bands with center frequencies including 28 GHz, 39 GHz, and 60 GHz, but radio waves in frequency ranges other than this example can also be used. The following description uses the example in which radio waves with 28 GHz center frequency are used for the antenna module 100.

Referring to FIG. 1, the communication device 10 includes the antenna module 100 and a baseband integrated circuit (BBIC) 200 forming a baseband-signal processing circuit. The antenna module 100 includes a radio-frequency integrated circuit (RFIC) 110, which is an example of a feed circuit, and an antenna device 120. In the communication device 10, a signal is transferred from the BBIC 200 to the antenna module 100, up-converted into a radio-frequency signal, and emitted from the antenna device 120; and a radio-frequency signal is received by the antenna device 120, down-converted, and processed by the BBIC 200.

For ease of description, FIG. 1 illustrates only configurations corresponding to four fed elements 121 out of a plurality of fed elements 121 constituting the antenna device 120. Configurations corresponding to the other fed elements 121 having the same configuration are omitted. FIG. 1 illustrates an example in which the antenna device 120 is constituted by the plurality of fed elements 121 arranged in a two-dimensional array, but the antenna device 120 is not necessarily constituted by a plurality of fed elements 121 but may be constituted by a single fed element 121. Alternatively, the plurality of fed elements 121 may be arranged in a line as a one-dimensional array. In the present embodiment, the fed element 121 is a patch antenna formed as a substantially square flat plate.

The RFIC 110 includes switches 111A to 111D, 113A to 113D, and 117, power amplifiers 112AT to 112DT, low-noise amplifiers 112AR to 112DR, attenuators 114A to 114D, phase shifters 115A to 115D, a signal combiner and splitter 116, a mixer 118, and an amplifier circuit 119.

When a radio-frequency signal is transmitted, the switches 111A to 111D and 113A to 113D are switched to establish connection to the power amplifiers 112AT to 112DT, and the switch 117 establishes connection to a transmit amplifier of the amplifier circuit 119. When a radio-frequency signal is received, the switches 111A to 111D and 113A to 113D are switched to establish connection to the low-noise amplifiers 112AR to 112DR, and the switch 117 establishes connection to a receive amplifier of the amplifier circuit 119.

A signal transferred from the BBIC 200 is amplified by the amplifier circuit 119 and up-converted by the mixer 118. The up-converted transmit signal, which is a radio-frequency signal, is split into four signals by the signal combiner and splitter 116. The four signals pass through four signal paths and separately enter the different fed elements 121. At this time, the phase shifters 115A to 115D disposed on the signal paths are adjusted with respect to phase, so that the directivity of the antenna device 120 can be controlled.

By contrast, radio-frequency signals received by the fed elements 121 are communicated through four different signal paths and combined together by the signal combiner and splitter 116. The combined receive signal is down-converted by the mixer 118, amplified by the amplifier circuit 119, and transferred to the BBIC 200.

The RFIC 110 is formed as, for example, a one-chip integrated-circuit component having the circuit configuration described above. Alternatively, in the RFIC 110, the particular devices (the switches, the power amplifier, the low-noise amplifier, the attenuator, and the phase shifter) corresponding to each of the fed elements 121 may be formed as a one-chip integrated-circuit component corresponding to each of the fed elements 121.

(Antenna Module Structure)

Next, a structure of the antenna module according to the first embodiment will be described in detail with reference to FIGS. 2 and 3. A plan view of the antenna module 100 is provided in FIG. 2A, and a sectional view taken at a feed point SP1 is provided in FIG. 2B. In the plan view in FIG. 2A and the drawing of FIG. 3, part of a dielectric substrate 130 is not illustrated so that the internal structure can be easily viewed. FIG. 3 is a perspective view of the antenna module 100.

Figure 2A:
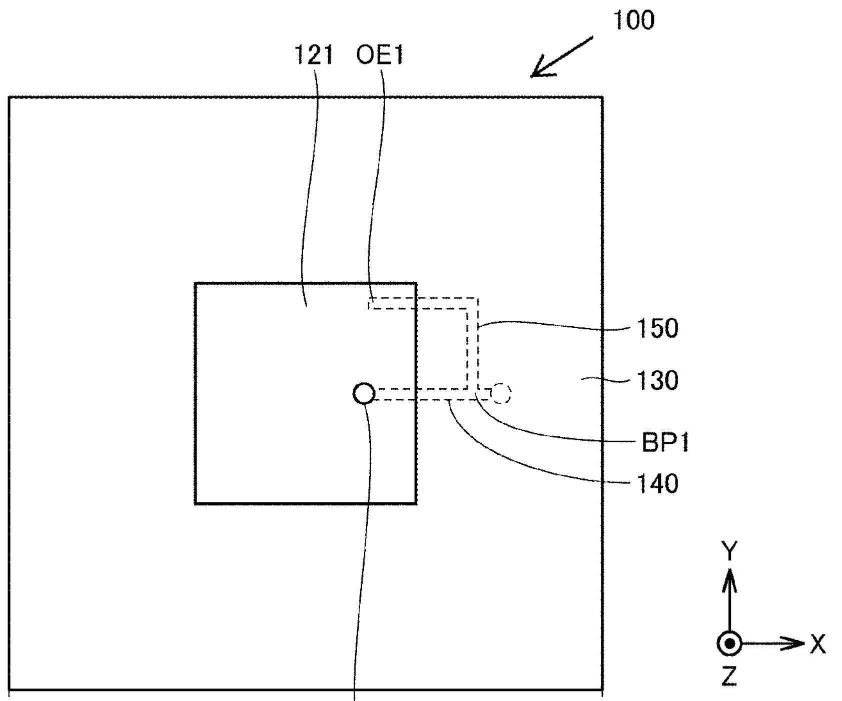
FIG. 2A provides a plan view and FIG. 2B provides a sectional view of the antenna module of the first embodiment.
Figure 2B:
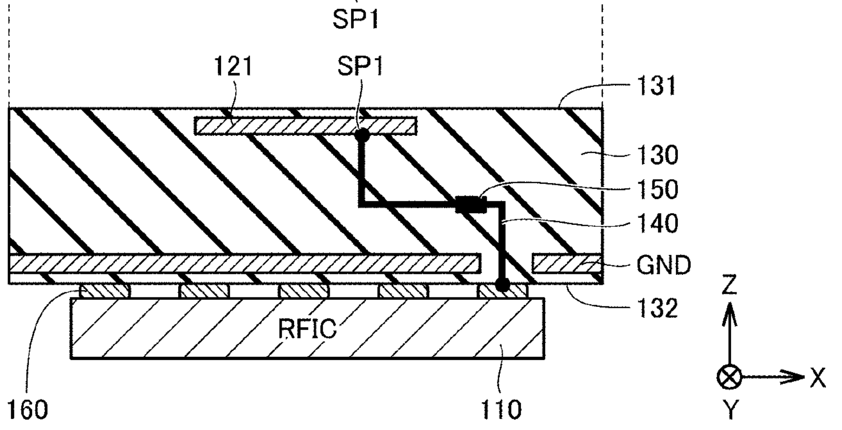
Figure 3:
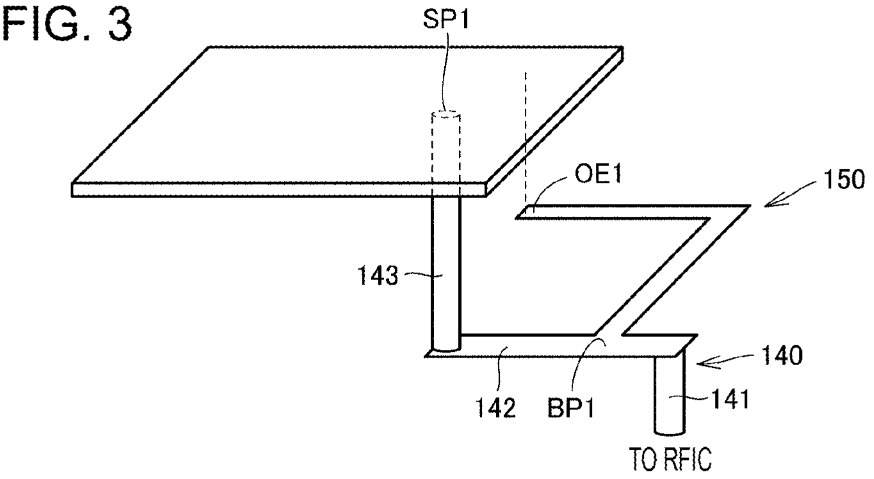
FIG. 3 is a perspective view of the antenna module in FIG. 2.

Referring to FIGS. 2A and 2B, the antenna module 100 includes, in addition to the fed element 121 and the RFIC 110, the dielectric substrate 130, a feed line 140, a stub 150, and a ground electrode GND. In the following description, the forward direction of the Z axis in the drawings may be referred to as upper, and the reverse direction may be referred to as lower.

The dielectric substrate 130 may be, for example, a low temperature co-fired ceramics (LTCC) multilayer substrate, a multilayer resin substrate formed by stacking a plurality of layers made of a resin, such as epoxy or polyimide, a multilayer resin substrate formed by stacking a plurality of resin layers made of a liquid crystal polymer (LCP) having a relatively low permittivity, a multilayer resin substrate formed by stacking a plurality of resin layers made of a fluorocarbon resin, or a multilayer ceramic substrate made of a ceramic other than LTCC.

The dielectric substrate 130 is shaped in a planer rectangular. The substantially square fed element 121 is disposed at an inner layer of the dielectric substrate 130 or on a front surface 131 of the upper side of the dielectric substrate 130. At the dielectric substrate 130, the ground electrode GND is disposed at a lower layer with respect to the fed element 121. On a back surface 132 of the lower side of the dielectric substrate 130, the RFIC 110 is disposed with the solder bumps 160 interposed between the dielectric substrate 130 and the RFIC 110.

A radio-frequency signal is outputted from the RFIC 110, communicated through the feed line 140 extended through the ground electrode GND, and consequently transferred to the feed point SP1 of the fed element 121. The feed point SP1 is offset from the center (intersection point of diagonal lines) of the fed element 121 in the forward direction of the X axis in FIGS. 2A and 2B. The radio-frequency signal is inputted to the feed point SP1, and as a result, the fed element 121 emits a radio wave polarized in the X-axis direction.

As illustrated in FIG. 3, the feed line 140 is extended upwards as a via hole 141 from the RFIC 110 to a layer between the ground electrode GND and the fed element 121;

the feed line 140 is further extended as a wire pattern 142 in the layer to a point under the fed element 121; the feed line 140 is further extended upwards as a via hole 143 from the point to the feed point SP1 of the fed element 121.

The stub 150 is provided in the feed line 140 to control impedance at a resonant frequency of the fed element 121. The stub 150 is an open stub having one end that is coupled to a branch point BP1 of the feed line 140 and the other end that is open as an open end OE1. In the example in FIGS. 2A and 2B, the stub 150 is formed in a substantially L-shape by being extended in the forward direction of the Y axis from the branch point BP1 in the wire pattern 142 of the feed line 140 and bent in the reverse direction of the X axis at a point between the branch point BP1 and the open end OE1. Such an L-shape bend can leave a distance between the fed element 121 and the stub 150 as long as possible across the length from the branch point BP1 to the open end OE1, and thus, it is possible to reduce unnecessary coupling between the stub 150 and the fed element 121. When viewed in plan view in the normal direction to the antenna module 100 (that is, the Z-axis direction), the open end OE1 of the stub 150 coincides with the fed element 121. In the example in FIG. 2A, when the antenna module 100 is viewed in plan view, the branch point BP1 does not coincide with the fed element 121. Because the branch point BP1 and the fed element 121 do not coincide with each other, it is possible to reduce the area in which the stub affects the electric field (lines of electric force) between the fed element 121 and the ground electrode GND, and as a result, the antenna can exhibit properties originally possessed by the antenna.

The line length of the stub 150 is determined in accordance with the wave length of the radio wave emitted by the fed element 121. The position of the branch point BP1 to the stub 150 in the feed line 140 is determined in accordance with the frequency of the radio wave emitted by the fed element 121.

Figure 4:
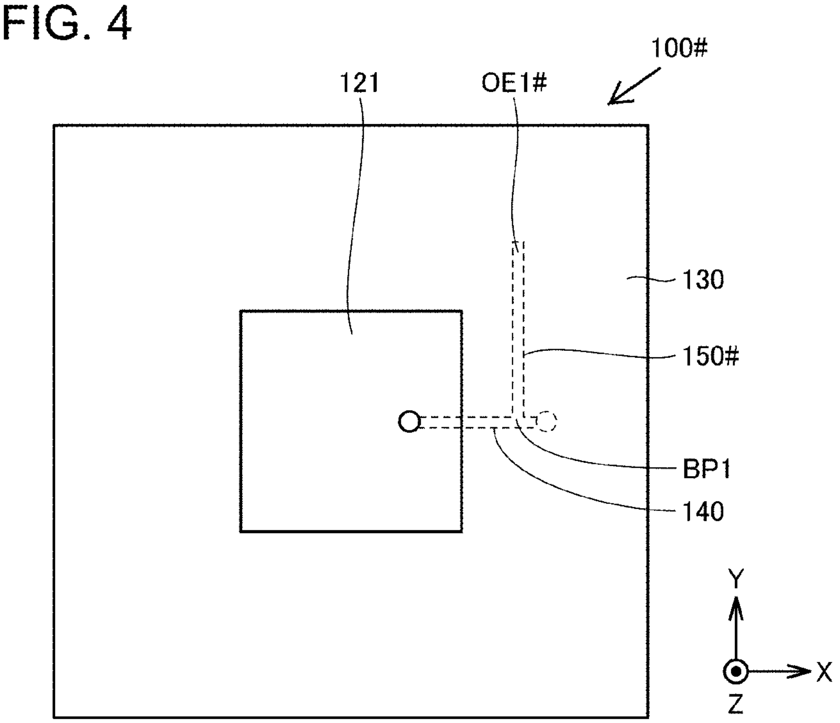
FIG. 4 is a plan view of an antenna module of a comparative example.

FIG. 4 is a plan view of an antenna module 100 #of a comparative example. In the antenna module 100 #, a stub 150 #branches off at the branch point BP1 in the feed line 140 is formed as a linear stub extended in the forward direction of the Y axis. When the antenna module 100 is viewed in plan view, an open end OE1 #of the stub 150 #does not coincide with the fed element 121.

Figure 5:
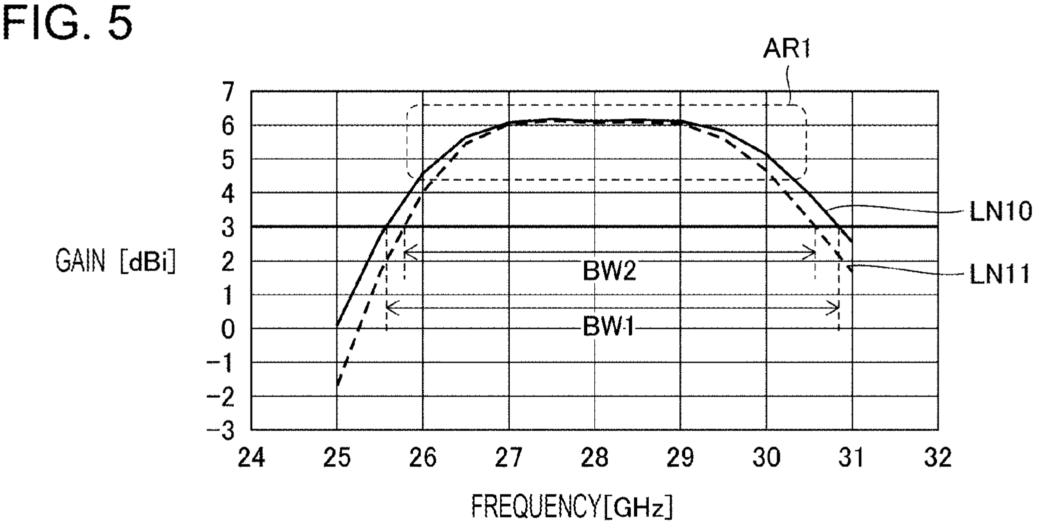
FIG. 5 illustrates antenna gain with respect to the first embodiment and the comparative example.

FIG. 5 illustrates antenna gain with respect to the first embodiment and the comparative example. In FIG. 5, the horizontal axis indicates frequency, and the vertical axis indicates gain. A solid line LN10 in FIG. 5 indicates the gain of the antenna module 100 of the first embodiment. A dashed line LN11 indicates the gain of the antenna module 100 of the comparative example. As illustrated in FIG. 5, when a comparison is made with regard to the frequency band width in which a particular gain (for example, 3 dB) can be achieved, a band width BW1 of the first embodiment is wider than a band width BW2 of the comparative example.

Figure 6:
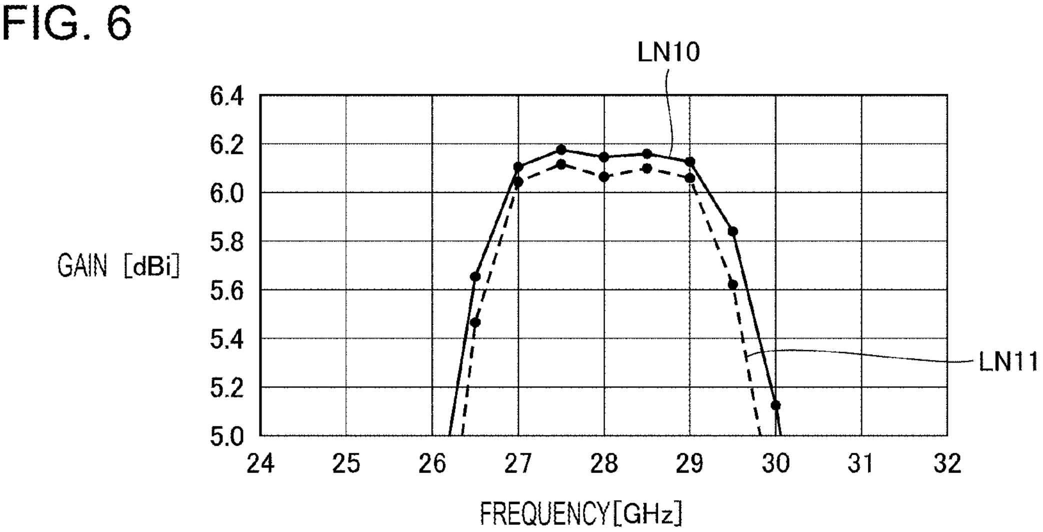
FIG. 6 illustrates a part of FIG. 5 in an enlarged manner.

FIG. 6 illustrates in an enlarged manner an area AR1 in which peak gains are indicated in FIG. 5. As illustrated in FIG. 6, in the range of 27 to 29 GHz, the peak gain of the first embodiment is better than the peak gain of the comparative example; more specifically, the peak gain of the first embodiment is approximately 0.1 dB higher than the peak gain of the comparative example.

Figure 7:
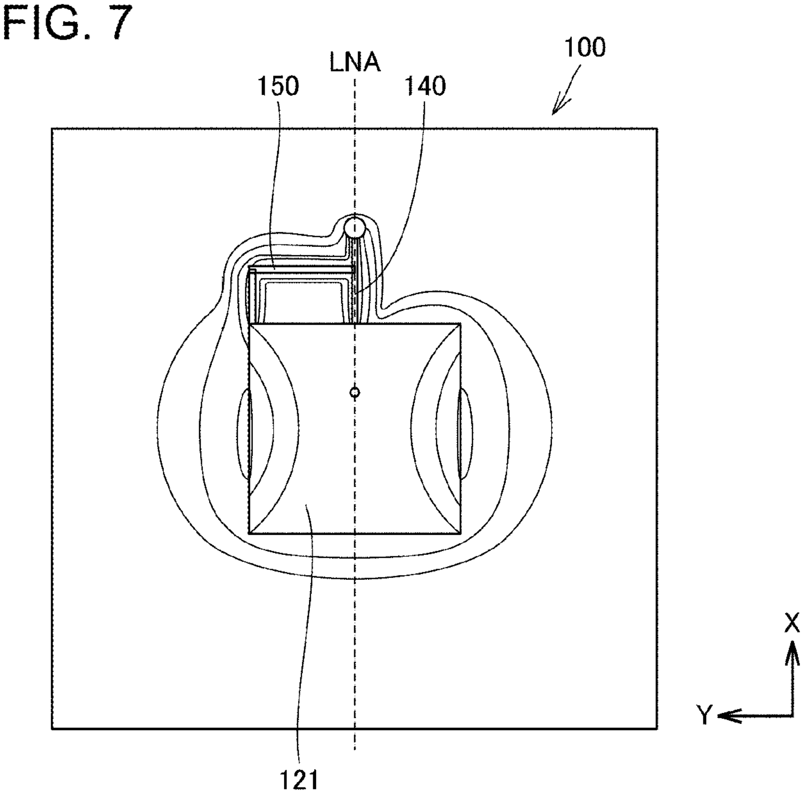
FIG. 7 illustrates an example of current distribution in a ground electrode of the antenna module according to the first embodiment.
Figure 8:
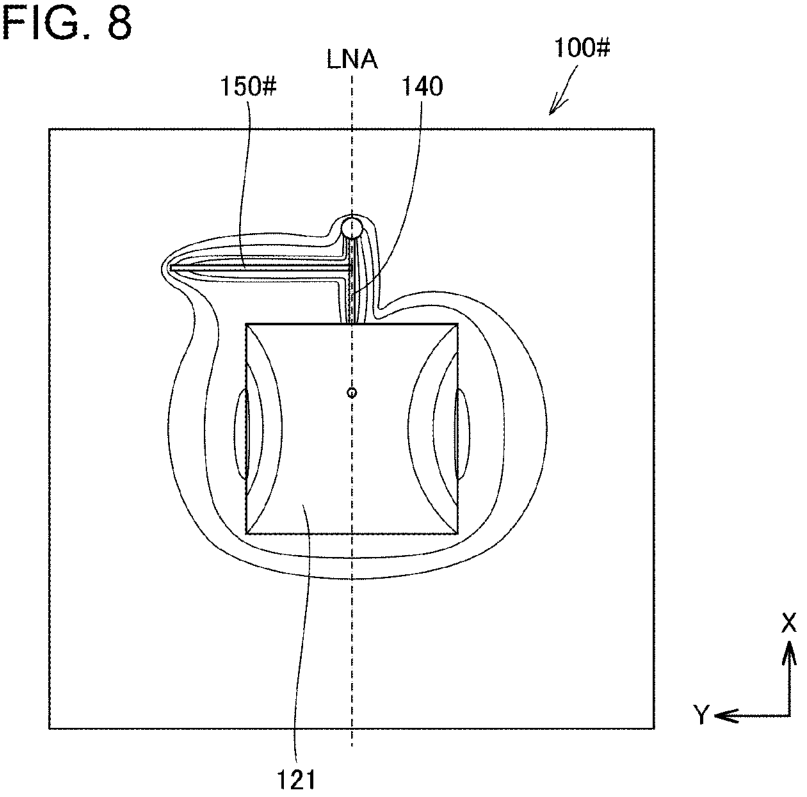
FIG. 8 illustrates an example of current distribution in a ground electrode of the antenna module according to the comparative example.

FIGS. 7 and 8 respectively illustrate the distribution of current flowing in the ground electrode GND of the antenna module according to the first embodiment and the distribution of current flowing in the ground electrode GND of the antenna module according to the comparative example. FIGS. 7 and 8 illustrate the current distribution by using contour lines.

Figure 9:
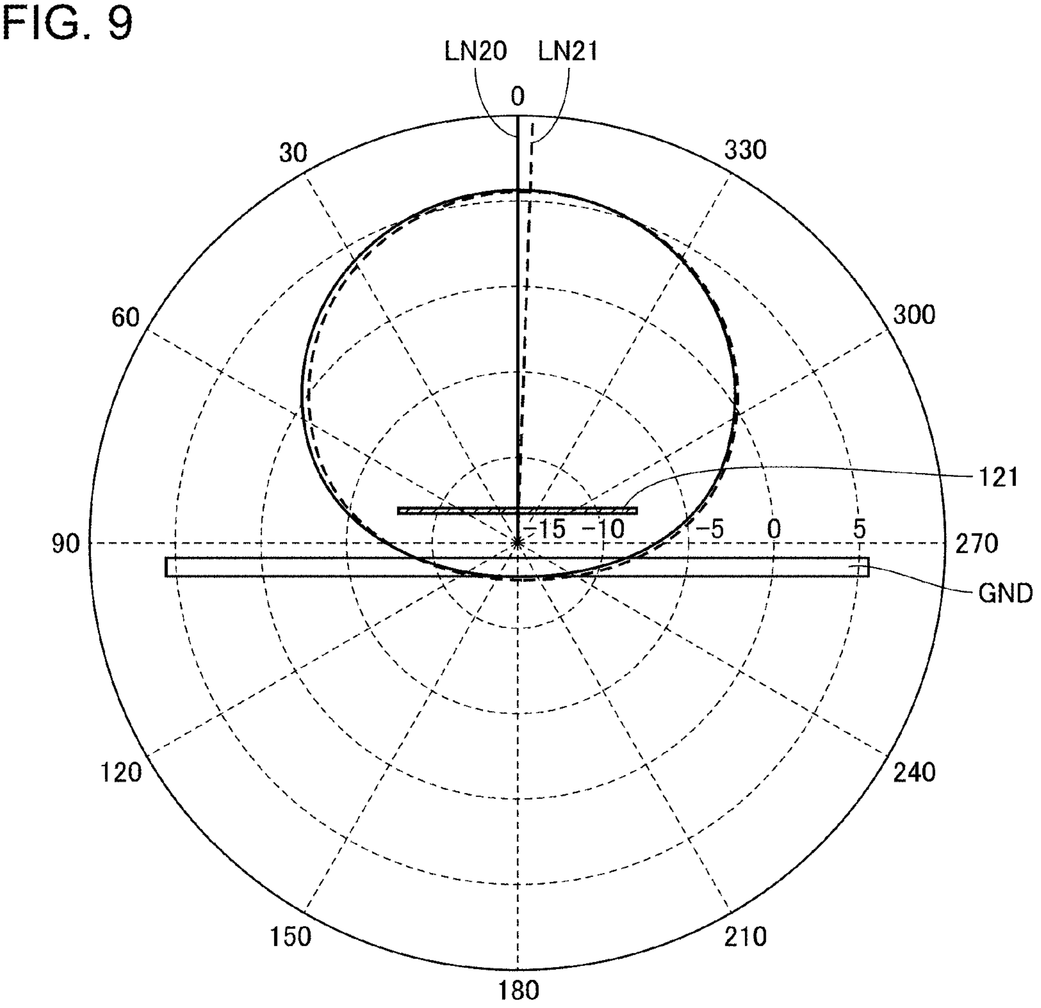
FIG. 9 illustrates the radiation direction of radio waves with respect to the first embodiment and the comparative example.

When FIGS. 7 and 8 are compared with each other, the antenna module 100 of the first embodiment is improved in comparison to the antenna module 100 #of the comparative example with respect to symmetry about a line LNA passing the feed point SP1 along the X axis. As a result, as illustrated in FIG. 9, the radiation direction (a line LN21) of radio waves in the comparative example is tilted by approximately 2° from the normal direction (the Z-axis direction) to the antenna module, whereas the radiation direction (a line LN20) of radio waves in the first embodiment is almost identical to the Z-axis direction. It can be considered that the improvement in antenna gain is caused by the improvement in symmetry of current distribution in the ground electrode GND due to change in the arrangement of the stub.

The more symmetrical about the line LNA in the Y-axis direction the current distribution in the ground electrode GND as illustrated in FIG. 7 is, the more antenna characteristics improve. The feed line 140 and the stub 150 can be positioned within the width of the fed element 121 in the Y-axis direction as illustrated in FIG. 7.

Figure 10:
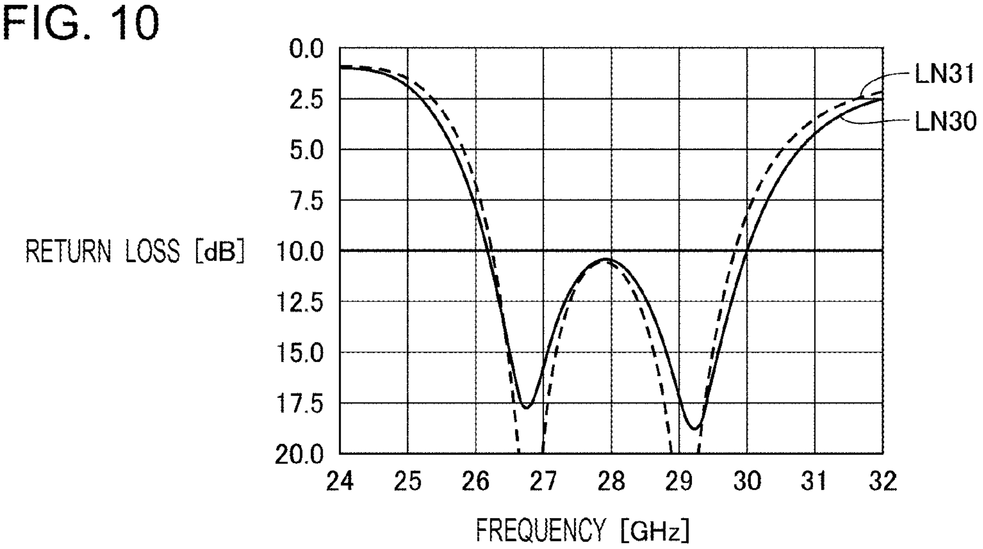
FIG. 10 illustrates return loss with respect to the first embodiment and the comparative example.

FIG. 10 illustrates return loss with respect to the first embodiment and the comparative example. As illustrated in FIG. 10, in terms of the frequency band width in which return loss is less than 10 dB, the first embodiment (a solid line LN30) is wider than the comparative example (a dashed line LN31).

As described above, in the antenna module including a patch antenna as a fed element, the open end of the open stub disposed in the feed line coincides with the fed element when the antenna module is viewed in plan view, and as a result, it is possible to improve antenna characteristics, such as antenna gain and return loss.

(First Modification)

Regarding the antenna module 100 of the first embodiment, a description has been made using the structure in which a branch is formed in the feed line 140 at a position not covered by the fed element 121 when the antenna module 100 is viewed in plan view.

Figure 11:
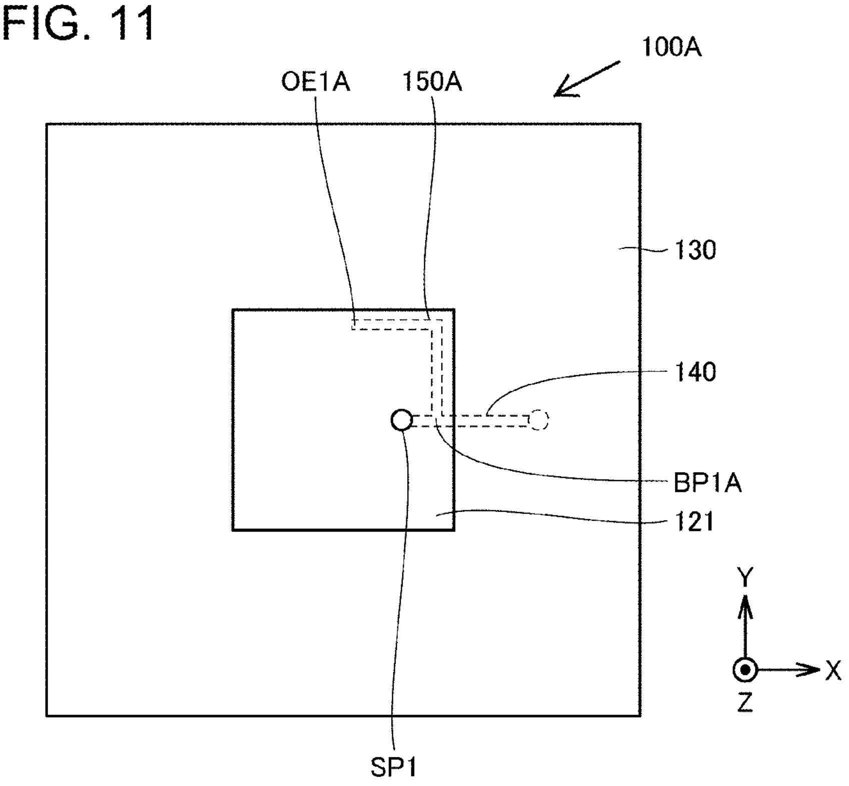
FIG. 11 is a plan view of an antenna module according to a first modification.

FIG. 11 is a plan view of an antenna module 100A according to the first modification. In the antenna module 100A, a stub 150A is an L-shaped open stub similarly to the first embodiment. When the antenna module 100A is viewed in plan view, the stub 150A branches off from the feed line 140 at a position covered by the fed element 121, and the open end OE1 of the stub 150A coincides with the fed element 121; in other words, the L-shaped stub 150A is entirely covered by the fed element 121.

The position of the branch point of the stub in the feed line (in other words, the distance from the feed point of the fed element to the branch point) is typically determined in accordance with the frequency of radio waves emitted by the fed element. Thus, when particular frequencies are used, the entire stub can coincide with the fed element as illustrated in FIG. 11. Also in this case, because the open end of the open stub coincides with the fed element, it is possible to improve symmetry of current distribution in the ground electrode GND in comparison to the arrangement of the linear stub as in the comparative example illustrated in FIG. 8. Consequently, similarly to the first embodiment, antenna characteristics can be improved.

This means that, when particular frequency ranges of radio waves are used, the stub may need to be positioned close to the fed element; however, also in this case, the stub is bent and disposed at a position that enables the open end of the stub to coincide with the fed element, and as a result, symmetry of current distribution in the ground electrode is improved. Such a structure can improve antenna characteristics when the stub is disposed close to the fed element.

Second Embodiment

Regarding the first embodiment, a description has been made using the application of the stub of the present disclosure in the antenna module including as a fed element the single fed element configured to receive a radio-frequency signal from the RFIC. The following descriptions of second to fourth embodiments will be made using the application of the stub of the present disclosure in an antenna module including as a fed element an unfed element configured not to receive any radio-frequency signal from the RFIC, in addition to a fed element.

Figure 12A:
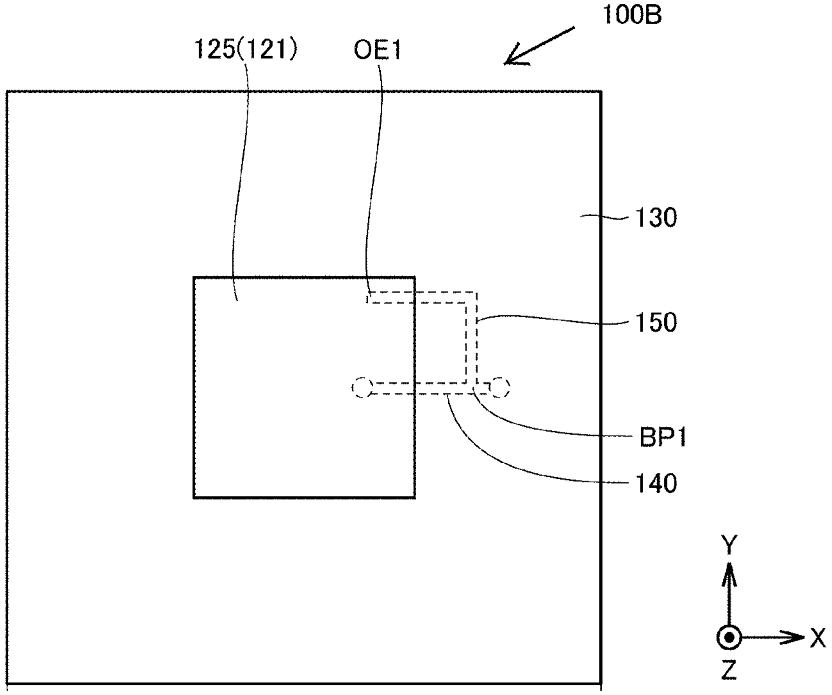
FIG. 12A provides a plan view and FIG. 12B provides a sectional view of an antenna module according to a second embodiment.
Figure 12B:
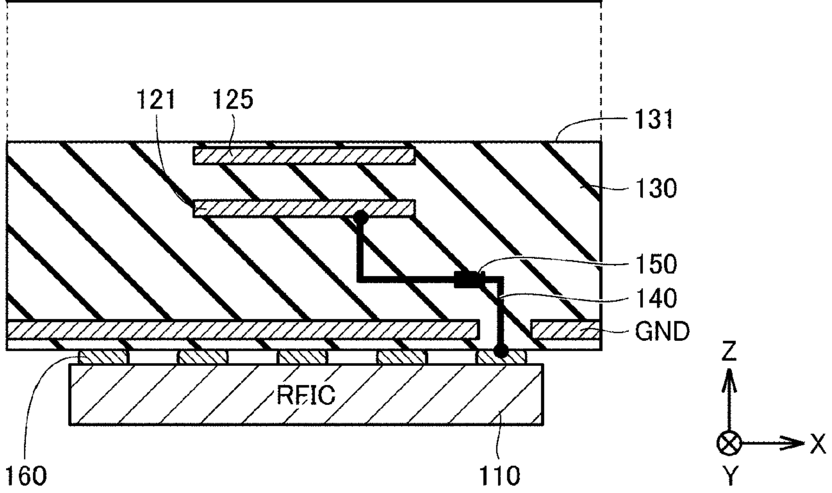

FIG. 12A provides a plan view and FIG. 12B provides a sectional view of an antenna module 100B according to the second embodiment. In the antenna module 100B, an unfed element 125 is disposed at a position upper than the fed element 121 in the dielectric substrate 130, and the unfed element 125 faces the fed element 121. Regarding FIGS. 12A and 12B, redundant descriptions of elements identical to the elements in FIGS. 2A and 2B of the first embodiment are not repeated.

The unfed element 125 is usually provided for the purpose of widening the frequency band width of radio waves emitted by the antenna module 100B. The unfed element 125 is basically formed in a planer shape of a size almost identical to the size of the fed element 121. Thus, when the antenna module 100B is viewed in plan view in the normal direction to the antenna module 100B, the open end OE1 of the stub 150 coincides with both the fed element 121 and the unfed element 125.

When the fed element 121 and the unfed element 125 are different in size from each other, the open end OE1 of the stub 150 only needs to coincide with at least one of the fed element 121 and the unfed element 125. Specifically, when the fed element 121 is larger than the unfed element 125, the stub 150 may coincide with only the fed element 121; when the fed element 121 is smaller than the unfed element 125, the stub 150 may coincide with only the unfed element 125.

Also in the structure in which the unfed element is disposed at a position upper than the fed element as in the second embodiment, when the antenna module is viewed in plan view, the open stub disposed in the feed line is provided at a position that enables the open end of the stub to coincide with the fed element and/or the radiating element (hereinafter also referred to as "radiating element" in an inclusive manner). This improves antenna characteristics.

Third Embodiment

Figure 13A:
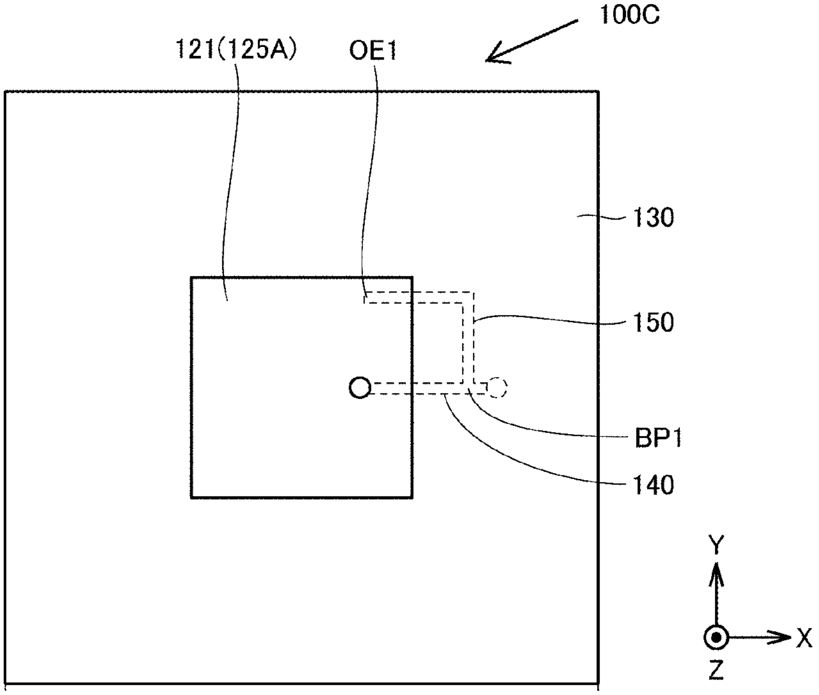
FIG. 13A provides a plan view and FIG. 13B provides a sectional view of an antenna module according to a third embodiment.
Figure 13B:
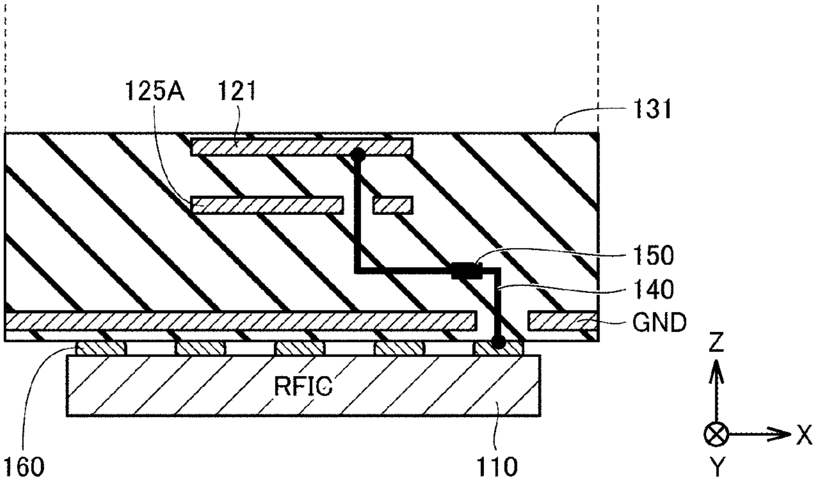

FIG. 13A provides a plan view and FIG. 13B provides a sectional view of an antenna module 100C according to the third embodiment. Referring to FIGS. 13A and 13B, in the antenna module 100C, an unfed element 125A is disposed at a layer between the fed element 121 and the ground electrode GND to face the fed element 121. Regarding FIGS. 13A and 13B, redundant descriptions of elements identical to the elements in FIGS. 2A and 2B of the first embodiment are not repeated.

The via hole 143 of the feed line 140 is extended through the unfed element 125A and coupled to the feed point SP1 of the fed element 121. The unfed element 125A is formed in a planer shape of a size almost identical to the size of the fed element 121. The unfed element 125A as in the third embodiment is also provided for the purpose of widening the frequency band width of radio waves emitted by the antenna module 100C.

When the antenna module 100C is viewed in plan view, the open end OE1 of the stub 150 coincides with both the fed element 121 and the unfed element 125. This improves antenna characteristics.

Fourth Embodiment

The first to third embodiments have described a single-band antenna module that emits radio waves in a single frequency range. The following description of the fourth embodiment will be made using the application of the stub of the present disclosure in a dual-band antenna module that emits radio waves in two frequency ranges.

Figure 14A:
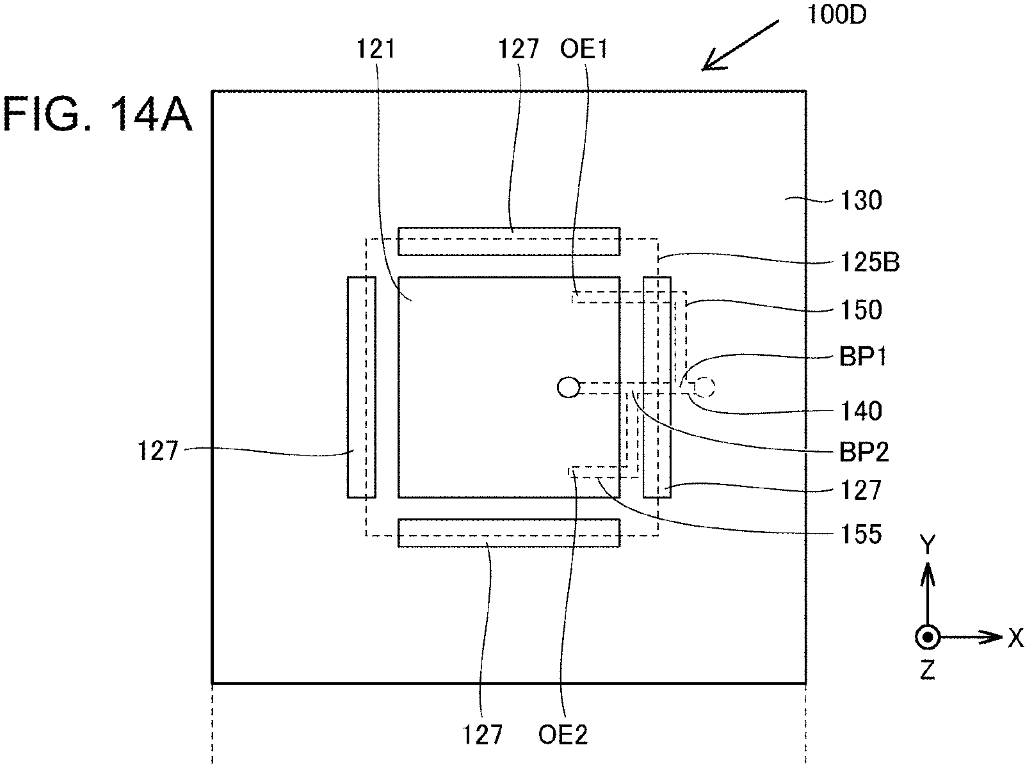
FIG. 14A provides a plan view and FIG. 14B provides a sectional view of an antenna module according to a fourth embodiment.
Figure 14B:
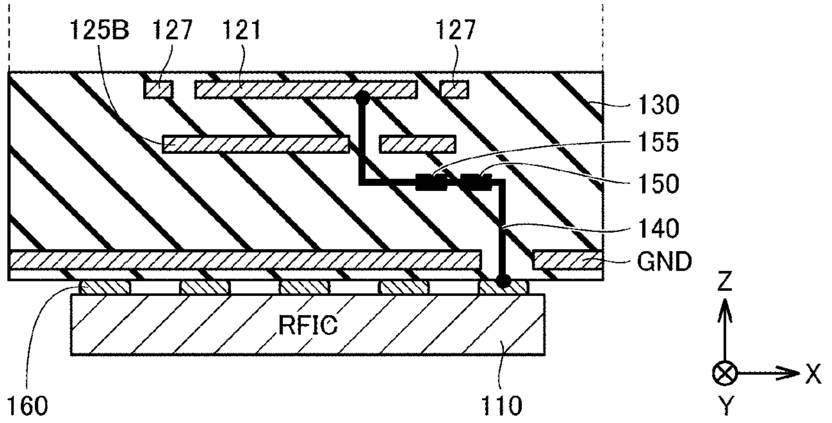

FIG. 14A provides a plan view and FIG. 14B provides a sectional view of an antenna module 100D according to the fourth embodiment. Referring to FIGS. 14A and 14B, in the antenna module 100D, an unfed element 125B is disposed at a layer between the fed element 121 and the ground electrode GND similarly to the third embodiment, but the unfed element 125B is larger than the fed element 121. The feed line 140 is not coupled to the unfed element 125B. However, because the feed line 140 is extended through the unfed element 125B, coupling is established between the feed line 140 and the unfed element 125B. As a result, the unfed element 125B also emits radio waves. Usually, as the size of the radiating element increases, the resonant frequency of the radiating element decreases; thus, the radiating element emits radio waves of a relatively low frequency. Consequently, the unfed element 125B emits radio waves of a frequency lower than the frequency of the fed element 121.

The antenna module 100D in FIGS. 14A and 14B includes parasitic elements 127 arranged around the fed element 121. The parasitic elements 127 face four sides of the fed element 121 at the same layer as the layer of the fed element 121. These parasitic elements 127 are provided for the purpose of widening the frequency band width of radio waves emitted by the fed element 121. The parasitic elements 127 are not necessarily provided. When the fed element 121 can achieve a desired frequency range by itself, the parasitic elements 127 may be excluded.

The stub 150 for the fed element 121 and a stub 155 for the unfed element 125B are disposed in the feed line 140. The line length of the stub 150 is determined in accordance with the wave length of the radio wave emitted by the fed element 121. The position of the branch point BP1 to the stub 150 in the feed line 140 is determined in accordance with the frequency of the radio wave emitted by the fed element 121.

The line length of the stub 155 is determined in accordance with the wave length of the radio wave emitted by the unfed element 125B. The position of a branch point BP2 to the stub 155 in the feed line 140 is determined in accordance with the frequency of the radio wave emitted by the unfed element 125B.

When the antenna module 100D is viewed in plan view, the open end OE1 of the stub 150 and an open end OE2 of the stub 155 coincide with at least one of the fed element 121 and the unfed element 125B.

As described above, also in the dual-band antenna module including a fed element and an unfed element larger than the fed element, stubs are provided to respectively correspond to the fed element and the unfed element, and the open ends of the stubs coincide with the fed element and the unfed element when the antenna module is viewed in plan view. This improves antenna characteristics.

Although the description of the antenna module 100D in FIGS. 14A and 14B use the example with the stub 150 corresponding to the fed element 121 and the stub 155 corresponding to the unfed element 125B, either the stub 150 or 155 may be excluded from the configuration. Alternatively, either the stub 150 or 155 may be not bent so that the open end of the stub fails to coincide with the radiating element (fed element and unfed element). For example, when the stub is so short that the open end of the stub being bent is unable to coincide with the radiating element, in view of design simplification and reduction in manufacturing variations, the stub can be not bent.

Fifth Embodiment

The first to fourth embodiments have described the configuration in which a single fed element emits a radio wave of one polarization wave. A fifth embodiment describes a configuration in which a fed element emits two kinds of radio waves of polarization waves different from each other.

Figure 15:
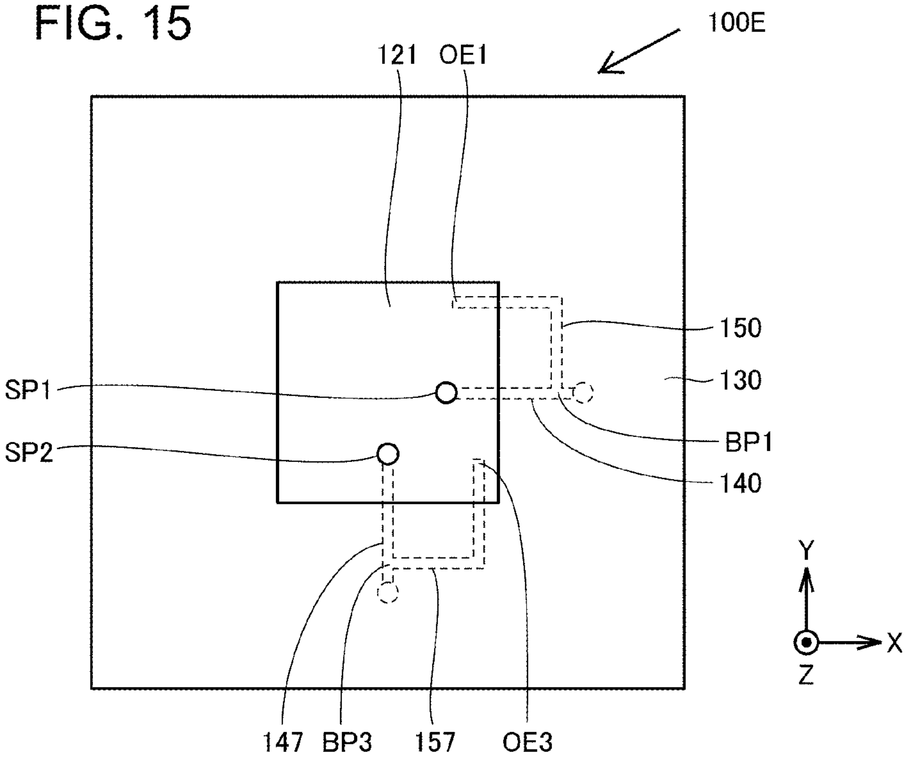
FIG. 15 is a plan view of a first example of an antenna module according to a fifth embodiment.

FIG. 15 is a plan view of an antenna module 100E according to the fifth embodiment. In the antenna module 100E, in addition to the configuration of the antenna module 100 of the first embodiment, the RFIC 110 also inputs a radio-frequency signal to another feed point SP2.

The feed point SP2 is offset from the center (intersection point of diagonal lines) of the fed element 121 in the reverse direction of the Y axis in FIG. 15. The RFIC 110 inputs a radio-frequency signal to the feed point SP2 through a feed line 147. This enables the fed element 121 to emit a radio wave polarized in the Y-axis direction.

A stub 157 is formed in an L-shape similarly to the stub 150. One end of the stub 157 is coupled to a branch point BP3 in the feed line 147. The other end of the stub 157, which is an open end OE3, coincides with the fed element 121 when the antenna module 100E is viewed in plan view.

As described above, the antenna module 100E according to the fifth embodiment emits a radio wave polarized in the X-axis direction and a radio wave polarized in the Y-axis direction by inputting radio-frequency signals to the feed points SP1 and SP2. When the antenna module 100E is viewed in plan view, the open ends of the stubs, which branch off from the feed lines for inputting radio-frequency signals to the feed points, coincide with the fed element 121.

This structure improves symmetry of current flowing in the ground electrode GND and consequently enhances antenna characteristics.

Figure 16:
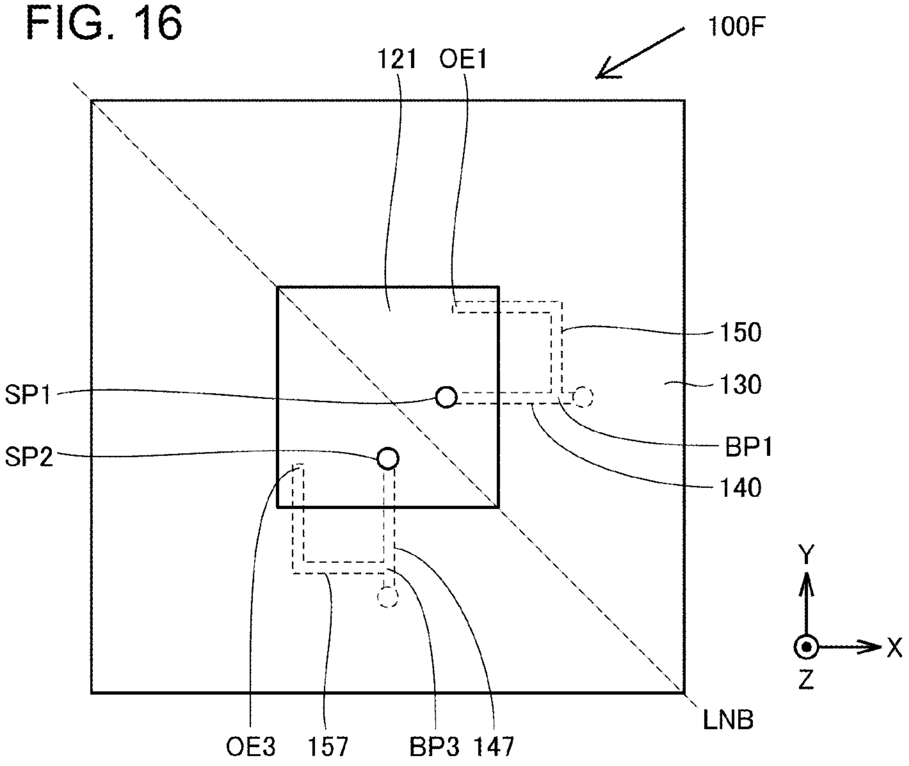
FIG. 16 is a plan view of a second example of the antenna module according to the fifth embodiment.

When the stub 157 coupled to the feed line 147 connected to the feed point SP2 branches off at the branch point BP3 in the reverse direction of the X axis as in the antenna module 100F illustrated in FIG. 16, the two stubs 150 and 157 are symmetrical about a diagonal line (line LNB in FIG. 16) of the fed element 121. This structure further improves symmetry of current flowing in the ground electrode GND and consequently more enhances antenna characteristics.

Sixth Embodiment

A sixth embodiment describes an example of a dual-band dual-polarization antenna module configured by combining the fourth and fifth embodiments.

Figure 17:
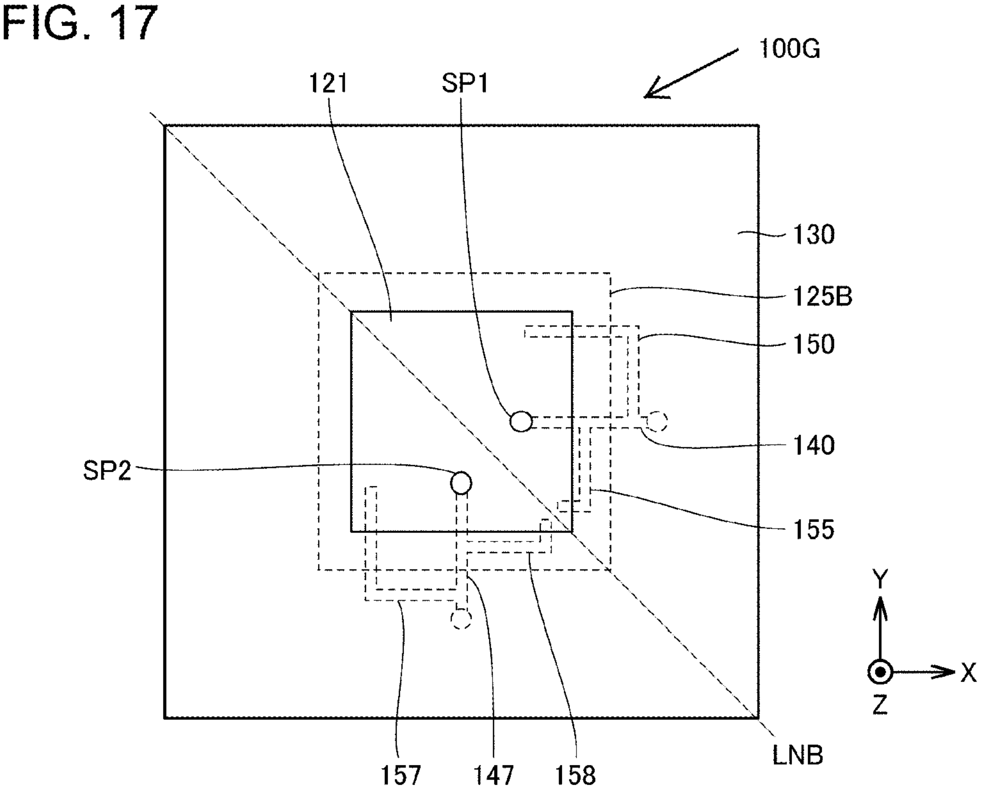
FIG. 17 is a plan view of an antenna module according to a sixth embodiment.

FIG. 17 is a plan view of an antenna module 100G according to the sixth embodiment. In the antenna module 100G, the fed element 121 and the unfed element 125B face each other in the Z-axis direction, and the feed lines 140 and 147 are respectively coupled to the feed points SP1 and SP2 of the fed element 121, in the same manner as the antenna module 100D in FIGS. 14A and 14B. The feed lines 140 and 147 are extended through the unfed element 125B to be coupled to the fed element 121.

The stubs 150 and 155 are arranged in the feed line 140. The stub 157 and a stub 158 are arranged in the feed line 147. The stubs 150, 155, 157, and 158 are all formed in an L-shape with a bend between a branch point of the corresponding feed line and its open end. When the antenna module 100G is viewed in plan view, the open end of each stub coincides with the fed element 121 and the unfed element 125B.

Also in the dual-band dual-polarization antenna module 100G, the stubs are arranged at positions that enable the open ends of the respective stubs to coincide with the radiating element (fed element and unfed element) in plan view. This improves symmetry of current flowing in the ground electrode and consequently enhances antenna characteristics. Also in this case, antenna characteristics can be more enhanced by arranging the stubs to have line symmetry about the diagonal line LNB of the radiating element as in FIG. 17.

(Second Modification)

Figure 18:
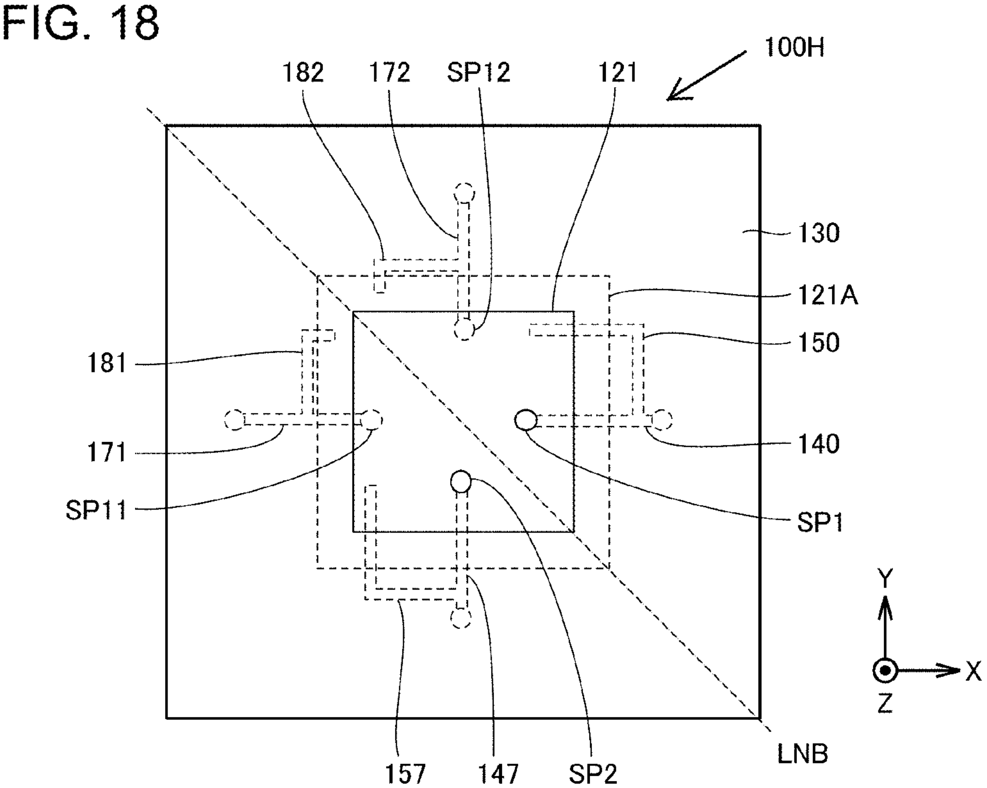
FIG. 18 is a plan view of an antenna module according to a second modification.

Although the antenna module 100G in FIG. 17 uses the fed element 121 and the unfed element 125B as the radiating elements, the two radiating elements may be both fed elements for dual-band application. In an antenna module 100H of a second modification illustrated in FIG. 18, the fed element 121 and a fed element 121A, which are different in size from each other, face each other in the Z-axis direction. To the fed elements, feed lines are coupled so that radio waves polarized in the X-axis direction and the Y-axis direction are emitted.

More specifically, the feed lines 140 and 147 are respectively coupled to the feed points SP1 and SP2 of the fed element 121. feed lines 171 and 172 are respectively coupled to feed points SP11 and SP12 of the fed element 121A. The stubs 150 and 157 are respectively arranged in the feed lines 140 and 147. Stubs 181 and 182 are respectively arranged in the feed lines 171 and 172. The stubs 150, 157, 181, and 182 are all formed in an L-shape with a bend between a branch point of the corresponding feed line and its open end. When the antenna module 100H is viewed in plan view, the open end of the stub 150 and the open end of the stub 157 coincide with the fed element 121, and the open end of the stub 181 and the open end of the stub 182 coincide with the fed element 121A.

As described above, also in the dual-band dual-polarization antenna module with two fed elements configured to be individually fed with power, the open ends of the stubs arranged in the feed lines coincide with the corresponding fed elements in plan view. This enhances antenna characteristics. Also in this case, antenna characteristics can be more enhanced by arranging the stubs to have line symmetry about a diagonal line of the fed element.

(Third Modification)

Figure 19:
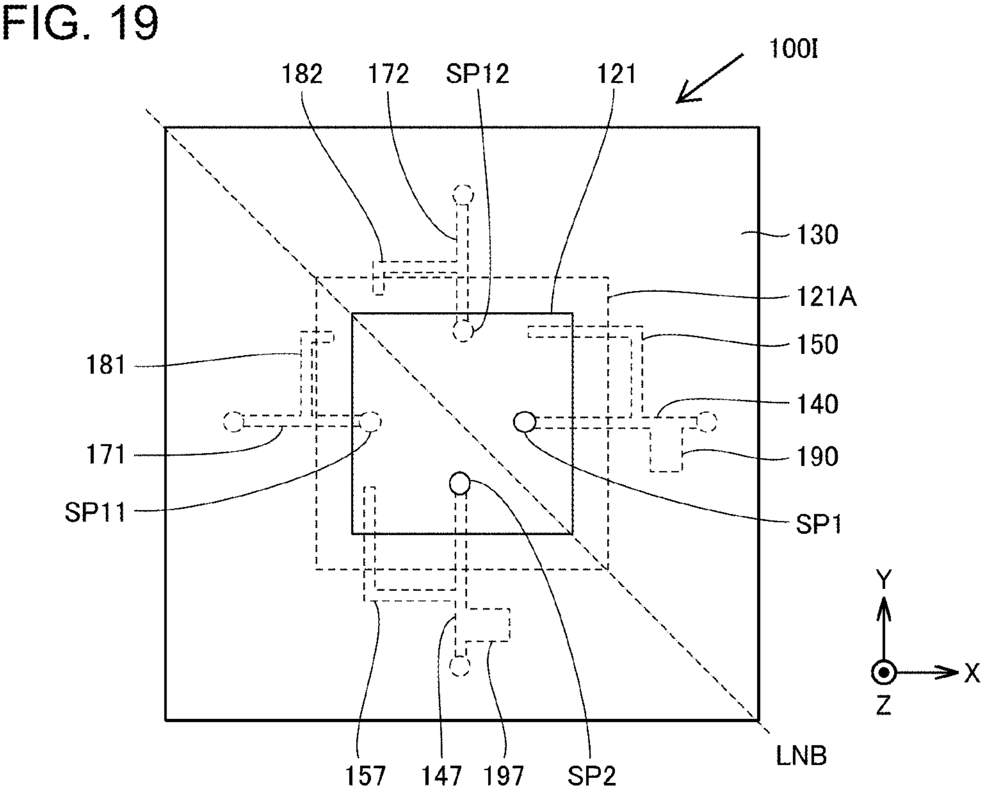
FIG. 19 is a plan view of an antenna module according to a third modification.

In the antenna module 100H of the second modification, the stub provided for the fed element may function as at least a part of a filter. For example, in an antenna module 100I according to the third modification in FIG. 19, capacitor electrodes 190 and 197 are disposed, in addition to the stubs 150 and 157, in the feed lines 140 and 147 for inputting radio-frequency signals to the fed element 121 for higher frequencies (for example, 39 GHz band). In each of the feed lines 140 and 147, the corresponding stub and the capacitance between the corresponding capacitor electrode and the ground electrode GND form a filter.

The resonance point can be adjusted by changing the length of the stub so that radio waves of lower frequencies in a frequency range (for example, 28 GHz band) emitted by the fed element 121A are attenuated. However, for radio waves of higher frequencies expected to be emitted by the fed element 121, the bandpass characteristic is not necessarily achieved at an optimum level. Typically, a stub operates as an inductance in the frequency range higher than the resonance point. Hence, a capacitor electrode is provided in the feed line so that a stub and the capacitor electrode form an LC parallel filter. This yields an anti-resonance point in a higher frequency range. As a result, it is possible to improve the bandpass characteristic for higher frequencies expected to be outputted.

Similarly, when a stub is provided for the fed element 121A for lower frequencies, the higher-frequency range can also be attenuated by changing the length of the stub. Typically, a stub operates as a capacitor in the frequency range lower than the resonance point. Hence, instead of or in addition to the configuration in FIG. 19, a stub for attenuating radio waves in the higher frequency range may be provided in the feed line for lower frequencies, and an inductance component formed by, for example, a short stub or pattern may be additionally provided in the feed line for lower frequencies. The inductance component and the capacitor component implemented as the stub together form an LC parallel filter, so that an anti-resonance point of lower frequencies is formed. This improves the bandpass characteristic for lower frequencies.

Although in the embodiments described above the radiating elements, stubs, and ground electrode are arranged at one dielectric substrate, all the elements are not necessarily arranged at one substrate. For example, as an antenna module 100J in FIG. 20, the fed element 121 may be disposed in or on another dielectric substrate 135. Alternatively, as an antenna module 100K in FIG. 21, the fed element 121 and the stub 150 may be disposed in or on another dielectric substrate 136.

Figure 20:
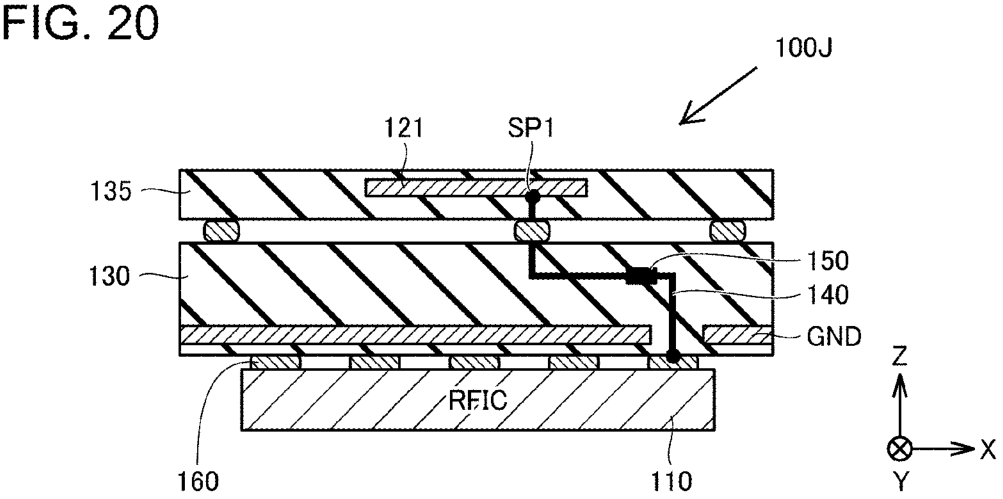
FIG. 20 is a sectional view illustrating a first example of the arrangement of elements at dielectric substrates.
Figure 21:
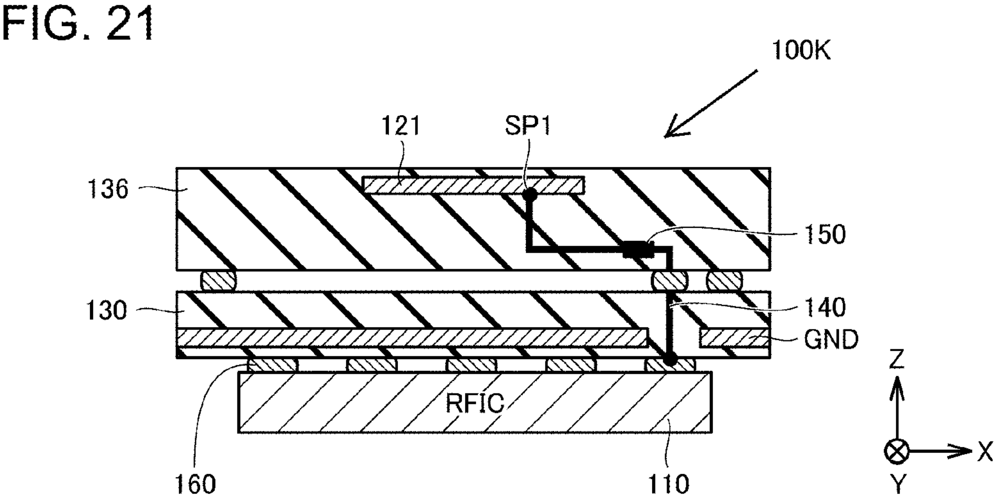
FIG. 21 is a sectional view illustrating a second example of the arrangement of elements at dielectric substrates.

In both FIGS. 20 and 21, the dielectric substrate 130 including the ground electrode GND and the dielectric substrate 135 or 136 including the fed element 121 are joined together by soldering or adhesive bonding. The divisions of the feed line 140 divided at some midpoint are coupled to each other by using a solder or another line.

The embodiments disclosed herein should be considered as an example in all respects and not construed in a limiting sense. The scope of the present disclosure is indicated by not the above description of the embodiments but the claims, and all changes which come within the meaning and range of equivalency of the claims are therefore intended to be embraced therein.

REFERENCE SIGNS LIST communication device, 100, 100A-100K antenna module, 110 RFIC, 111A-111D, 113A-113D, 117 switch, 112AR-112DR low-noise amplifier, 112AT-112DT power amplifier, 114A-114D attenuator, 115A-115D phase shifter, 116 signal combiner and splitter, 118 mixer, 119 amplifier circuit, 120 antenna device, 121, 121A fed element, 125, 125A, 125B unfed element, 127 parasitic element, 130, 135, 136 dielectric substrate, 140, 147, 171, 172 feed line, 141, 143 via hole, 142 wire pattern, 150, 150A, 155, 157, 158, 181, 182 stub, 160 solder bump, 190, 197 capacitor electrode, 200 BBIC, BP1, BP1A, BP2, BP3 branch point, GND ground electrode, OE1, OE1A, OE1 #, OE2, OE3 open end, SP1, SP2, SP11, SP12 feed point

The invention claimed is:

1. An antenna module comprising:

a dielectric substrate having a multilayer structure;

a ground electrode in or on the dielectric substrate;

a plate-like fed element facing the ground electrode, the fed element being at different layer of the dielectric substrate than the ground electrode;

a first feed line configured to transfer a first radio-frequency signal to a first feed point of the fed element; and a first stub that branches off from the first feed line at a first branch point of the first feed line, the first stub having a first open end, wherein:

the first stub is between the fed element and the ground electrode, and when the dielectric substrate is viewed in a plan view, the first open end overlaps the fed element.

2. The antenna module according to claim 1, wherein when the dielectric substrate is viewed in the plan view, the first branch point does not overlap the fed element.

3. The antenna module according to claim 1, wherein the first stub is bent between the first branch point and the first open end.

4. The antenna module according to claim 1, further comprising:

a second feed line configured to transfer a second radio-frequency signal to a second feed point of the fed element; and a second stub that branches off from the second feed line at a second branch point of the second feed line, the second stub having a second open end, wherein when the dielectric substrate is viewed in the plan view, the second open end overlaps the fed element.

5. An antenna module comprising:

a dielectric substrate having a multilayer structure;

a ground electrode in or on the dielectric substrate;

a plate-like fed element facing the ground electrode, the fed element being at a different layer of the dielectric substrate than the ground electrode;

an unfed element facing the fed element, the unfed element being at a different layer of the dielectric substrate than the ground electrode and the fed element;

a feed line configured to transfer a radio-frequency signal to the fed element; and a first stub that branches off from the feed line at a first branch point of the feed line, the first stub having a first open end, wherein:

the first stub is between the fed and unfed elements and the ground electrode, and when the dielectric substrate is viewed in a plan view, the first open end overlaps the fed element or the unfed element.

6. The antenna module according to claim 5, wherein the fed element is in a layer of the dielectric substrate between the unfed element and the ground electrode.

7. The antenna module according to claim 5, wherein:

the unfed element is in a layer of the dielectric substrate between the fed element and the ground electrode, and the feed line extends through the unfed element, and is coupled to the fed element.

8. The antenna module according to claim 7, further comprising:

a parasitic circuit element around the fed element.

9. The antenna module according to claim 7, wherein a frequency of a radio wave emitted by the fed element is different from a frequency of a radio wave emitted by the unfed element.

10. The antenna module according to claim 9, further comprising:

a second stub that branches off from the feed line at a second branch point of the feed line, the second stub having a second open end, wherein when the dielectric substrate is viewed in the plan view, the second open end overlaps the fed element or the unfed element.

11. The antenna module according to claim 1, further comprising:

a feed circuit configured to input the radio-frequency signal to the fed element via the feed line.

12. The antenna module according to claim 5, further comprising:

a feed circuit configured to input the radio-frequency signal to the fed element via the feed line.

13. A communication device comprising the antenna module according to claim 1.

14. A communication device comprising the antenna module according to claim 5.

* * * * *